Jan. 14, 1969     J. P. PHILLIPS, JR     3,421,304

FRUIT PICKING APPARATUS AND IMPROVEMENTS THEREIN

Filed Dec. 10, 1965

INVENTOR.
Joel P. Phillips, Jr.
BY Roger L. Martin

ATTORNEY

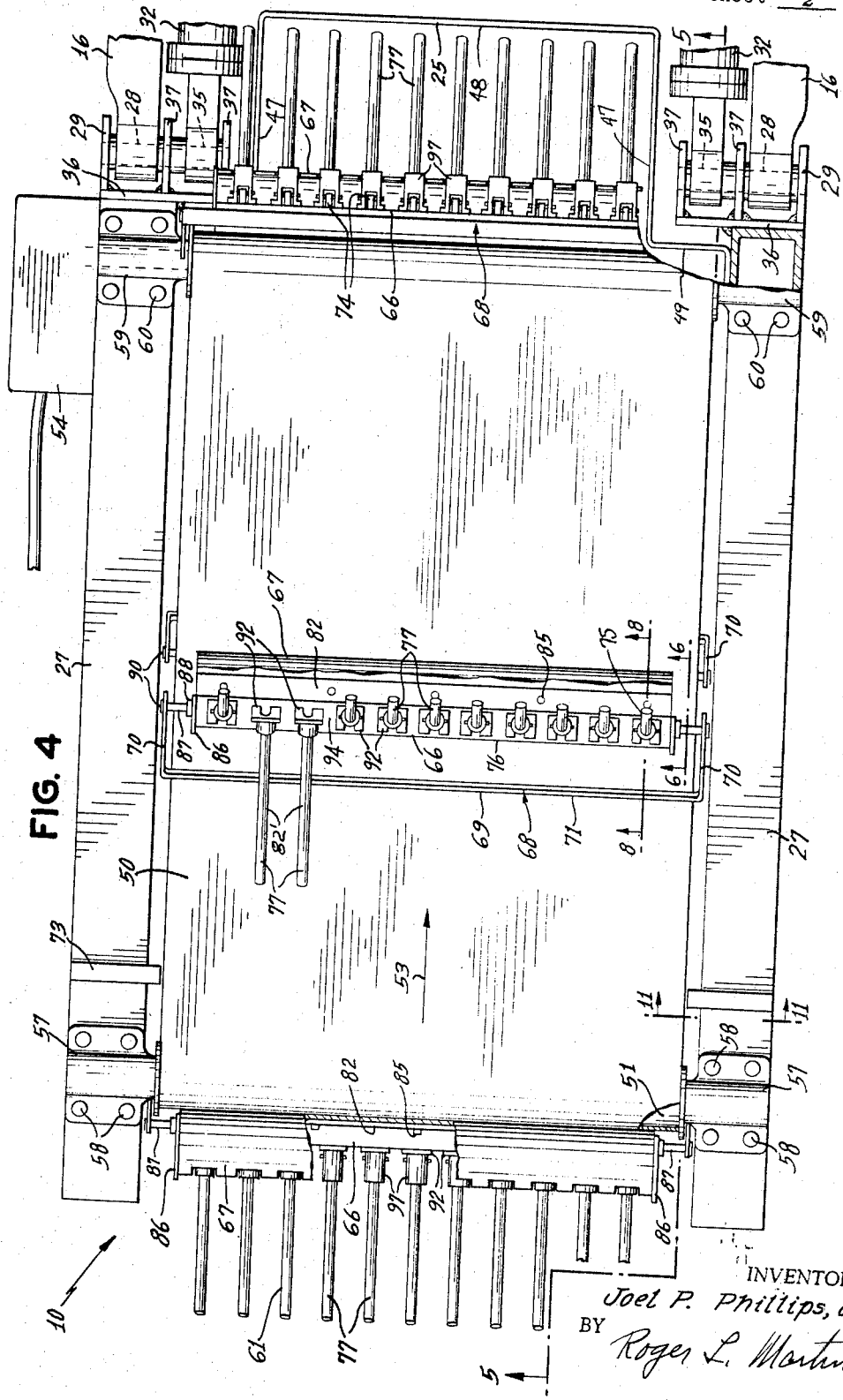

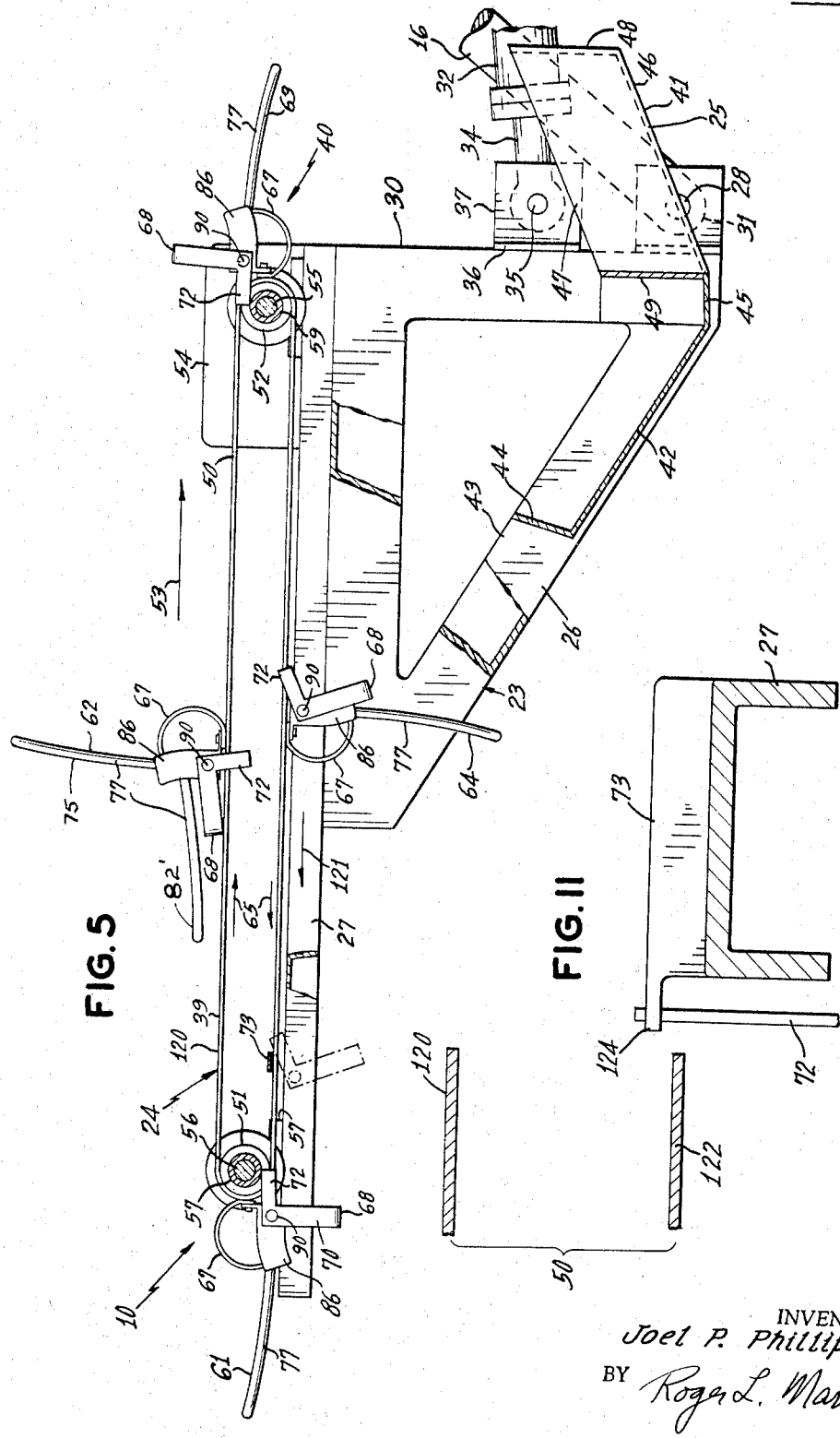

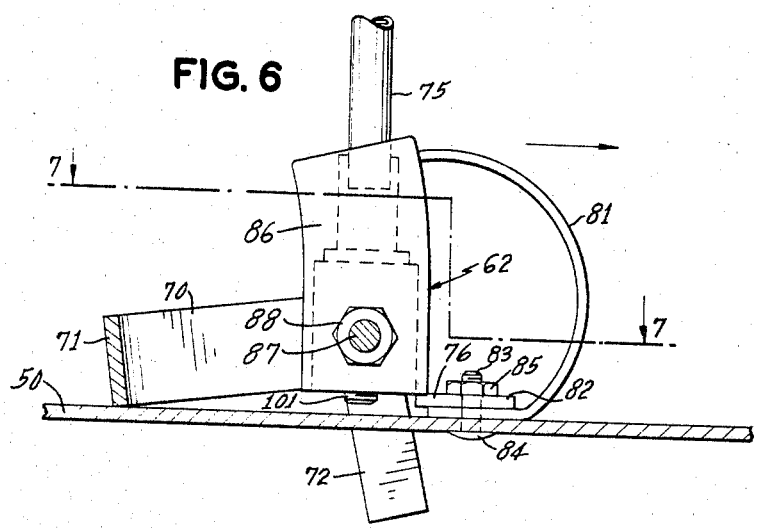
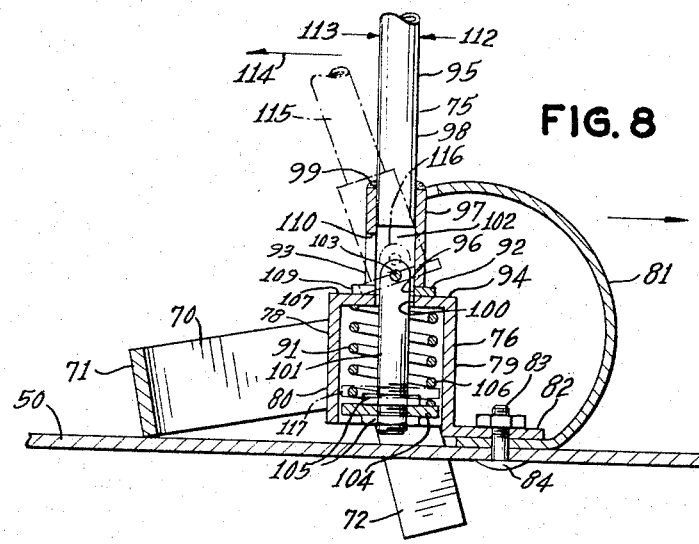
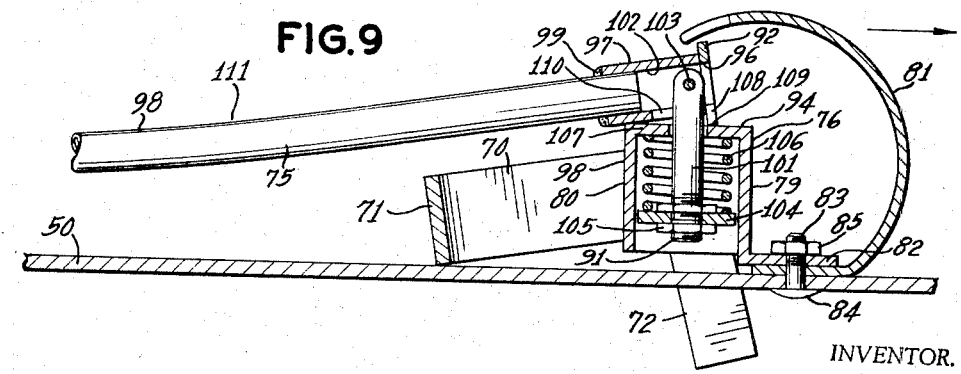

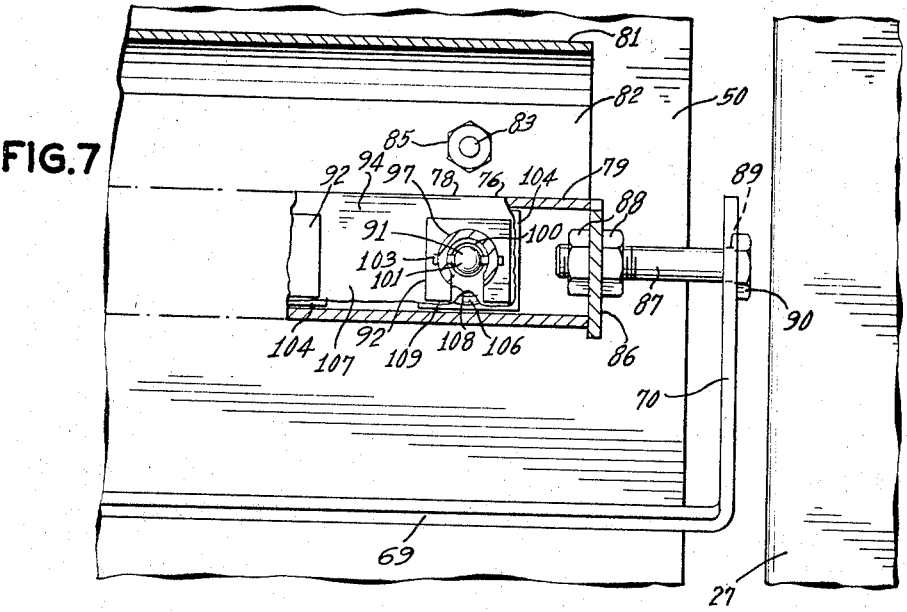
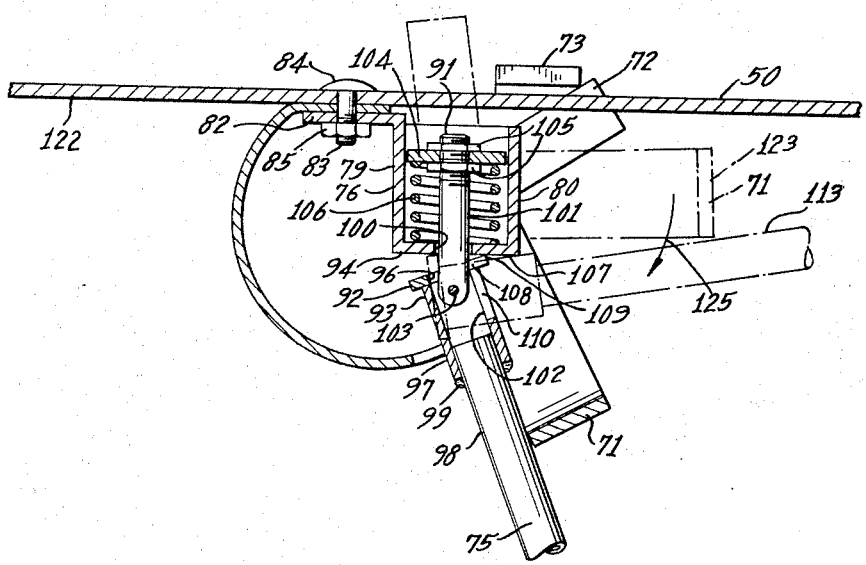

United States Patent Office 3,421,304
Patented Jan. 14, 1969

3,421,304
FRUIT PICKING APPARATUS AND IMPROVEMENTS THEREIN
Joel P. Phillips, Jr., Winter Park, Fla., assignor to Phillips Harvesting Co., Winter Park, Fla., a corporation of Florida
Filed Dec. 10, 1965, Ser. No. 513,016
U.S. Cl. 56—328
Int. Cl. A01g 19/00
13 Claims

ABSTRACT OF THE DISCLOSURE

A self-propelled vehicle carries a fruit harvester on a front end pivot frame and the harvester has a picking mechanism which includes a plurality of finger containing assemblies that are belt mounted for movement through the branches of a tree and whereat the fingers act like a comb or rake in detaching the fruit. The fingers are mounted for pivotal movement between working and nonworking positions and a spring type device is provided for retaining each finger in its working position in the assembly. These devices, however, yield when the fingers encounter a nonyielding obstruction in the tree and permit the finger to pivot into its nonworking position and whereat the finger is retained by the device until again set up along the path traversed by the belt. Each finger assembly has a set up device for returning the fingers to their working positions and the device includes a yoke component which is carried by the belt and which is actuated by an appropriately located cam.

---

This invention relates to improvements in fruit harvesting apparatus and more particularly to improved equipment or mechanism for picking or detaching fruit from the branches of a tree, the improved equipment being especially suitable for picking citrus fruit such as oranges, tangerines, grapefruit and the like from citrus trees.

A general object of the invention is to provide improvements in fruit picking equipment used in harvesting fruit and which utilize combing or sometimes called raking principles in detaching the fruit from the trees.

Fruit picking equipment that utilize the combing principles in severing the fruit from the branches of the tree have a plurality of fingers which are arranged in an orderly fashion and which are drawn through the branches of the tree during the harvesting of the crop thereon. The fingers in such arrangements are so spaced as to trap the fruit and prevent it from passing between the fingers while nevertheless being sufficiently spaced so that the fingers are adapted to straddle most of the branches in the fruit laden area of the tree as the fingers are drawn through the area being subjected to the picking process.

Equipment of this kind has not been widely accepted in the citrus industry by the owners of the groves for reasons that the equipment tends to damage the trees as well as the fruit. Citrus trees are commonly sheared by the grove owners and hence in the fruit laden areas of the tree it is not uncommon to find sizable limbs which can be encountered by the fingers of such equipment. In addition the growth pattern of the branches is unpredictable and hence many branches are unsuitably oriented for the approaches that are made by such equipment in harvesting the crops on the tree. This results in many branches becoming entangled in the fingers and hence the branches are either scared or broken during the picking process.

Attempts have been made to overcome some of these problems by using fingers in the picking equipment that are adapted to flex when they encounter an obstruction in their path of movement. Equipment of this type however has not proven to be successful for various reasons among which are the fact that the flexible fingers in returning to their normal working position after having encountered an obstruction tend to whip back into place. This frequently either causes further entanglements with the branches or causes damage to fruit about to be encountered and picked by the equipment.

Among other objects of the invention is one providing fruit picking equipment that operates in accord with the combing principles and which minimizes the amount of damage to the tree structure and fruit being harvested.

Yet another object of the invention is to provide fruit picking equipment which is more acceptable to grove owners for use in harvesting citrus crops.

One particular object of the invention is to provide a means for mounting fingers of fruit picking equipment which operates in accord with the principles of a comb and which enables the fingers to move out of the cooperative working position with the other fingers in the arrangement when the finger encounters an obstruction in the path of movement such as an unyielding limb or entanglement.

Yet another object of the invention is to provide a means for mounting fingers of picking equipment that operate in accord with the combing principles and which enables the fingers to withdraw from an entanglement without great difficulty during the normal course of operation of the device.

Yet another object of the invention is to provide improvements in picking equipment of the kind contemplated herein and which enable the fingers to assume a non-working position upon encountering a nonyielding growth structure in the tree being subjected to the harvesting actions of the equipment, and which provides means for returning the fingers to the working position in the arrangement under circumstances wherein the return movements of the fingers will not cause damage to fruit or structural components of the tree.

Still a further object of the invention is to provide a mounting for fingers in equipment of the kind contemplated herein and which can be used with advantage in either mounting rigid fingers or fingers which are flexible in nature.

Yet another object of the invention is to provide a novel mounting for the fingers of fruit picking equipment adapted for harvesting crops from trees, the mounting being characterized by the fact that it retains the fingers in a working position when in use and until such time as the fingers encounter an abnormal obstruction in their path and at which time the mounting permits the fingers to yield under the obstruction and thereafter assume a position that permits the fingers to by-pass the obstruction.

In accord with the invention provision is made for the fingers to pivot out of their cooperating working positions in the arrangement upon encountering an unyielding growth structure in the tree during the harvesting procedure. In accord with one aspect of the invention provision is made to retain the fingers in their working position against the normal forces which the fingers encounter in cooperatively detaching the fruit from the branches of the tree and to resist pivotal movement out of the working position and for also returning the fingers to their working position in the comb like arrangement. In accord with one aspect of the invention a device is provided for each finger which not only serves to retain the finger in its working position in the arrangement against normal forces which are encountered by the finger in cooperatively detaching the fruit from the branches but which yields to excessive forces and permits the finger to pivot out of the working position and thereafter return to the working position when the deflecting force has not been sustained sufficiently to cause the finger to move into a non-working position therefor. Yet another aspect of the invention relates to providing a device which serves to retain each finger in its working position in the arrangement while nevertheless yielding to excessive forces that are imparted to the finger when the finger encounters an unyielding obstruction in the path of movement in the arrangement and which also serves to retain the finger in a non-working position until such time as provision is made for again returning the finger to the working position at a point in the path of movement of the apparatus which is remote from the area of the tree being subjected to the harvesting procedure.

The novel features which are believed to be characteristic of this invention are set forth with particularity in the appended claims. The invention itself however both as to its organization and method of operation, together with further objects and advantages thereof may best be understood by reference to the following description taken in connection with the accompanying drawings in which:

FIG. 4 is a plan view of the fruit picking device as seen in the direction of arrow 4 in FIG. 2, with certain parts of the apparatus being broken away;

FIG. 5 is a section view taken generally along the lines 5—5 of FIG. 4 with certain parts being broken away and others removed and yet other parts shown in broken line positions they would normally assume during the operation of the device;

FIG. 6 is an enlarged view at one end of the finger assembly as seen generally along the lines 6—6 of FIG. 4, with certain parts broken away;

FIG. 7 shows a fragment of the assembly as generally seen along the lines 7—7 in FIG. 6;

FIG. 8 is a sectional view taken generally along the lines 8—8 of FIG. 4, with certain parts being removed and an intermediate position for certain other parts of the assembly being shown in broken lines;

FIG. 9 is view of the apparatus shown in FIG. 8 as seen when the finger has assumed the inoperative or non-working position;

FIG. 10 shows the same structure seen in FIGS. 8 and 9 as it reaches a point along the path traversed by the belt and at which the set up device comes into play, and with certain components being shown in broken line positions that are assumed before the set up device is actuated; and FIG. 11 is an enlarged fragment of the apparatus as generally seen along the lines 11—11 of FIG. 4.

Figure 1:
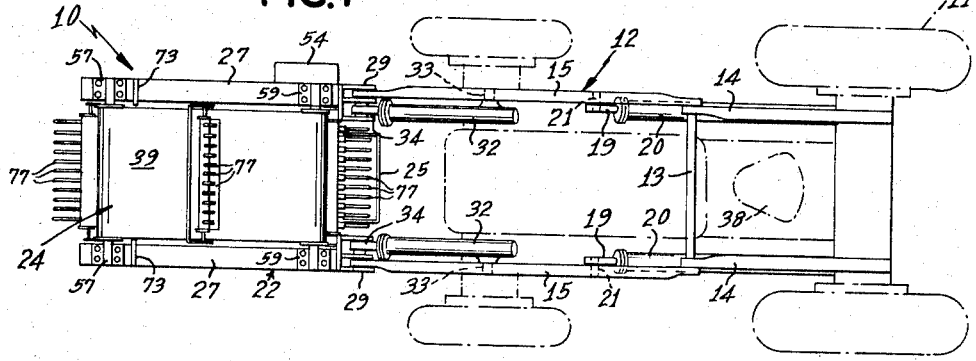
FIG. 1 is a plan view of an embodiment of the invention as it is seen when mounted on a self-propelled vehicle such as a tractor.
Figure 2:
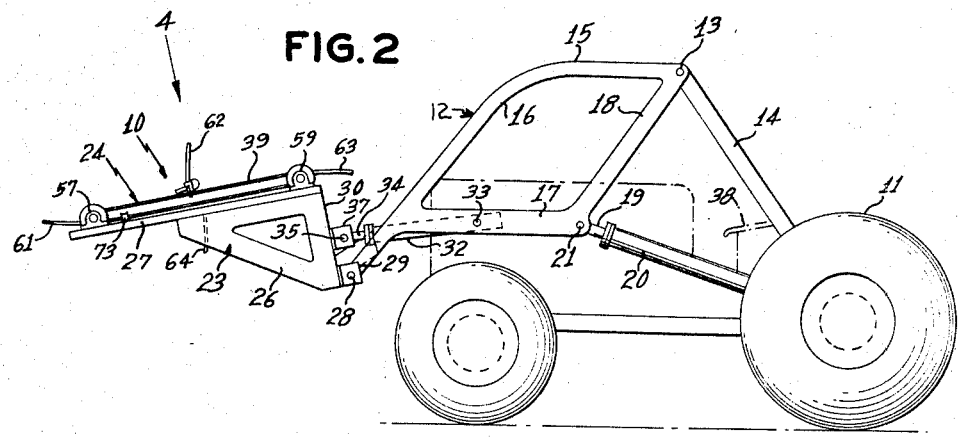
FIG. 2 is a side elevation of the apparatus shown in FIG. 1 as seen from the left side.
Figure 3:
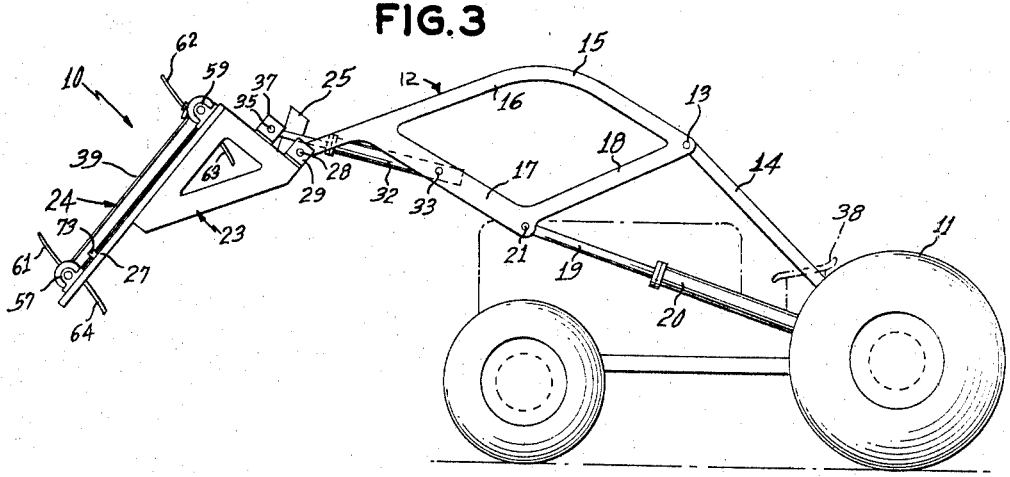
FIG. 3 is a view similar to that shown in FIG. 2 but where the harvester is differently oriented.

Now with particular reference to FIGS. 1, 2 and 3, an apparatus embodying the invention is generally designated by the numeral 10 wherein and is shown mounted at the front end of a self-propelled vehicle which is depicted as a tractor shown partly in broken lines at 11. Tractor 11 has a framework 12 which is so supported on the body of the tractor as to be pivotally movable about a horizontal pivot axis that extends transversely of the tractor. The pivot axis is established in the illustration by a shaft 13 that interconnects a pair of inclined struts 14 which are suitably mounted on the rear axle housing of the tractor and which incline forwardly thereof at the opposite sides of the vehicle. Frame 12 has a pair of rigid arms 15 which are arranged at the opposite sides of the tractor, and the rear ends of these arms 15 are carried by shaft 13 so that the framework 12 is adapted for pivotal movement about the axis of the shaft thereat.

Each of the arms as seen in FIGS. 2 and 3 includes structural members designated at 16, 17 and 18, and which are rigidly connected and welded together. Members 17 and 18 are angularly arranged beneath member 16 and are connected at the apex of the arrangement by a pivot element 21 to the piston arm 19 of a hydraulic cylinder 20 that is located adjacent the arm at its side of the tractor. These cylinders 20 are connected to a suitable source of hydraulic pressure carried on the tractor 11 and are connected in parallel and controlled by the driver of the tractor through the manipulation of suitable controls, not shown. Pivots 21 are offset from the pivot axis for frame 12 and through suitable control of cylinders 20, the arms may be extended and retracted to pivotally raise and lower the frame 12 at the front end of the tractor as is illustrated for example in FIG. 3 by the extension of the piston arm seen therein as compared to the arrangement seen in FIG. 2.

The harvesting apparatus 22 embodying the invention is carried in the illustration at the front end of frame 12 and has a frame 23 on which a picking mechanism 24 and gathering compartment 25 are mounted. Frame 23 has a pair of transversely spaced generally triangular brackets 26 which are respectively located at the opposite sides of the apparatus. Each bracket is welded to an elongated channel 27 that is associated with the bracket, and these channels of frame 23 serve to support the principal components of the picking mechanism 24.

Frame 23 is connected to the forward ends of the arm members 15 by pivot elements 28. Elements 28 serve to establish a transverse pivot axis for pivotal movement of frame 23 with respect to frame 12 and each bracket has a pair of lugs 29 which are welded at the lower end of the rear channel component 30 of the bracket. These lugs 29 are spaced apart in the arrangement to accommodate the location of the eye element 31 of the adjacent arm member 16 therebetween, and the pivot element pivotally interconnects the lugs and eye component thereat.

Pivotal movement of frame 23 with respect to frame 12 in the embodiment is accomplished through control of a pair of hydraulic cylinders 32 which are located at the opposite sides of the vehicle. These cylinders 32 are pivotally connected at their base ends to the adjacent arm members 17 of frame 12 as by pivot elements 33. Each cylinder is carried at the inside of its associated frame arm, and the piston arms 34 of these cylinders 32 are connected to the adjacent brackets 26 by means of pivot elements 35 which are transversely aligned in the arrangement. To facilitate the pivotal connections of the piston arms 34 to the adjacent brackets 26, a small plate is welded to the rear channel 30 of each bracket above the adjacent lugs 29. Each plate 36 projects inwardly of the bracket and carries a pair of lugs 37 which are spaced apart and arranged in working alignment with the cylinders 32. The eye components of the piston arms 34 fit between the adjacent lugs 37 and the arms are connected to the lugs by the pivot elements 35.

Cylinders 32 are also connected in parallel in the hydraulic system and are controlled by the driver through manipulation of suitable controls (not shown) from the seat 38 of the vehicle 11. As seen in FIGS. 2 and 3 by suitably controlling the cylinders to extend and retract the arms 34, frame 23 can be caused to pivot with respect to the axis established by pivots 28 so as to suitably orient the working face 39 of the picking mechanism in reference to the area of the tree from which the fruit is to be harvested.

During the process of harvesting the fruit from the tree, the picking mechanism is normally oriented on an incline such as is shown in FIG. 3, and as the friut which is picked through operation of the picking mechanism to be described hereinafter leaves the discharge end 40 of the mechanism 24, the fruit falls into a gathering compartment designated at 25. Compartment 25, as best seen in FIGS. 4 and 5, is arranged between the brackets 26 and has a rear portion 41 which juts out in back of the frame 23 between the cylinders 32. The front portion of compartment 25 has a plate 42 that extends between the brackets 26 and which is welded to the insides of the incline channels 43 of the brackets. The front end 44 of plate 42 is bent on an incline so as to aid in retaining the fruit in the compartment when the frame is inclined to facilitate appropriate orientation of the face 36 of the picking mechanism with respect to the area of the tree from which the fruit is being harvested. The rear portion 45 of plate 42 is also bent as seen in FIG. 5. The rear portion 41 of compartment 25 has an inclined bottom wall 46, upright side walls 47 at the opposite sides of wall 46, and an upright rear end wall 48. The rear portion serves as a receiving area for the fruit as it is discharged at the discharge end 40 of the picking mechanism. The metal bottom wall 46 is welded to the end of plate 42 and is suitably oriented between the cylinders 32. Small metal sections 49 are mounted upright on portion 45 at the front end of the side walls 47 and these sections extend laterally to the flanges of the adjacent channels 30 whereat they are bent and welded to the associated brackets. The compartment 25 is of course open at the top, and when the compartment is filled with picked fruit it may be emptied into a suitable container through suitable pivotal manipulation of frame 23 with respect to frame 12.

The picking mechanism 24 embodying the concepts of the invention has in this instance a continuous belt 50 which is trained over front and rear rollers respectively designated at 51 and 52 and which are provided with end flanges to aid in retaining the belt in position on the rolls. Belt 50 is driven in the direction of arrow 53 by means of a hydraulic motor 54 which is fastened to the right side of frame 23 and which is drivingly connected to the shaft 55 of the drive roll 52 in the arrangement. The assembled picking mechanism 24 is best seen in FIGS. 4 and 5 wherein it will be seen that the shaft 56 of the idler rolls 51 is journaled at its opposite ends in bearings 57 which in turn are secured in transverse alignment at the front ends of the side channels 27 of frame 23 by means of bolt type fasteners designated at 58. The shaft 55 for drive roll 52 is located at the rear of frame 23 and is also journaled in bearings 59 which are appropriately aligned and mounted at the opposite sides of the picking mechanism on the side channel components 27 of frame 23. These bearings are similarly fastened to the channels 27 by means of bolt elements designated at 60.

In the embodiment illustrated in the figures, the fingers of the picking mechanism 24 are arranged in four separate assemblies respectively designated at 61, 62, 63 and 64 in FIGS. 4 and 5, and wherein the fingers 77 in each assembly are spaced apart and orientered in a row that extends cross wise of belt 50. Assemblies 61, 62, 63 and 64 are spaced apart from one another along the face of belt 50 and are so mounted on the belt 50 as to be movable therewith and thus, during operation of mechanism 24, to be carried along the path 65 traversed by the belt 50. Although other finger arrangements may be provided, the arrangement illustrated serves to provide separate comb like arrangements which are successively drawn through the work area of the tree when the mechanism 24 is in use, and has the advantage that the fingers of each assembly can in accord with the preferred embodiment of the invention, pivot into a non-working position at the trailing side of its assembly when the need arises, and to do this without interference from the components of the next assembly to encounter the work area.

In addition to the fingers 77, each assembly also has a mechanism 66 for mounting the fingers on the belt 50 and which includes a plurality of spring type devices such as those designated at 74 in FIG. 4. Each device is associated with a separate one of the fingers in the assembly and as will be subsequently seen, these devices permit pivotal movement of the finger when a nonyielding obstruction is encountered by the finger along the path traversed by the assembly during operation of the picking mechanism. To avoid interference with the operation of the devices 74 as by branches, twigs, leaves and the like, a guard plate 67 is provided at the leading side of each assembly to shield the mounting mechanism 66 thereof. These guard plates 67 are arcuately contoured as seen in FIG. 5, and are provided with suitable cutout portions to accommodate the locations of the fingers at their working positions in the assembly. The guard plates facilitate deflection of the fruit and branches away from the mounting mechanism and toward the fingers of the assembly in the normal operation of the device.

As will be seen subsequently, each finger is so mounted as to be capable of being pivoted rearwardly from its working position when it encounters an obstruction in the tree structure which is unyielding to the normal forces encountered by the finger in detaching the fruit from the tree, and in the operation of the apparatus depicted in the drawings, may assume a collapsed or inoperative position such as seen by reference to the two fingers designated at 82' in FIGS. 4 and 5 and at which the finger is retained by certain components of the mounting mechanism 66 until it is thereafter returned to its working position in the arrangement. Hence each assembly has a set-up device associated with it, and these devices are collectively designated at 68 in FIGS. 4 and 5. Each of the devices 68 has a yoke 69 which spans the width of the belt in back of or at the trailing side of the assembly. The arms 70 of the yoke 69 extend forwardly of the yoke cross piece 71 and are pivotally connected at the opposite ends of the mounting mechanism associated with the assembly, as will be shown hereinafter. Each of the arms is also provided with a lever 72 that engages a cam component 73 at its side of the belt as the assembly is carried along the bottom run or flight of the belt. As the levers of the devices 68 engage the cams during each cycle taken by the assembly, the yoke is caused to pivot and set up those fingers which have been knocked down into the inoperative position during the cycle.

The arrangement of the various components of the assemblies and the working relation between the fingers and the components of the mounting are best seen by reference to the end finger 75 of assembly 62 and its relation to the adjacent structure depicted in FIGS. 6 through 10. The mounting mechanism for the fingers 77 of assembly 62 is designated at 76 in these figures, and has an elongated channel member 78 which is arranged to open downwardly toward the face of the belt in the assembly and to extend transversely of the mechanism 24 across the face of the belt. The front or leading flange 79 of the channel is equipped at its lower extremity with a forwardly extending flange section 82 that overlaps the base of the arcuate guard 81 for mechmanisms 76. The guard 81 and channel 78 are fastened to the belt 50 in the arrangement by means of spaced bolt type fasteners designated at 83. The heads 84 of these fasteners are beveled so as to facilitate their passage over the roll surfaces of rolls 51 and 52 as the assembly is carried along the belt path. These rolls incidently are preferably surfaced with resilient material such as rubber so as to provide a surface which yields somewhat upon encountering the heads 84 as the assemblies pass around the rolls. The fasteners 83 are provided with suitable nuts 85 which threadedly engage the threaded ends of the fasteners as seen in FIGS. 6 and 7. The method depicted for fastening the assembly 62 to belt 50 permits the assembly to pass smoothly around the rolls at the front and rear ends of the picking mechanism when the mechanism is in operation.

As best seen in FIGS. 6 and 7, small plates are welded at the opposite ends of the channel 78 to facilitate pivotally mounting the yoke member 69 for movement about a transverse axis that extends longitudinally of the channel. These plates 86 are welded at the ends of the channel and are appropriately contoured along their leading edges so as to deflect limbs, branches and other tree growth away from the mounting mechanism 76. The pivot axis for the yoke component 69 of the set up device 68 associated with assembly 62 is established by a pair of bolts 87 which are axially aligned and mounted at the opposite ends of the channel in the adjacent plates 86. Each bolt 87 has a threaded end which extends through a suitable aperture in the plate and which is locked in place by a pair of nuts designated at 88. The arms 80 of the yoke 87 are provided with suitable apertures 89 and the shank of the bolt extends through the aperture of the adjacent yoke arm and whereat the yoke is retained in place by the head 90 of the bolt as seen in FIG. 7.

The mounting mechanism 76 has a separate spring type device for each of the fingers in the assembly and which serves among other things to retain the finger in the assembly, the retaining device for finger 75 being designated at 91. Each finger in the assembly is equipped at its base end 93 with a flat, square, plate component and which is adapted and arranged to rest against the upper surface 94 of the channel 78 when the finger is in its working position in the assembly, such as is shown by the upright position designated at 95 in FIG. 8. The plate component 92 of finger 75 has a circular aperture 96 to accommodate the location of certain components of the retaining device 91 when the finger is in working position, and the finger 75 also has a cylindrical sleeve component 97 that is mounted upright on plate 92 and welded thereto in coaxial alignment with the axis of the aperture 96. The base end of the stem 98 of finger 75 fits in the upper end of sleeve 97 and is welded to the sleeve and thus rigidly secured in place by means of welds designated at 99.

The top wall 107 of channel 78 has a circular aperture 100 at the location of each finger in the assembly and which is arranged coaxially with the aperture 96 in the plate component of the finger when the finger is in the working position 95 in the arrangement. The spring retainer 91 includes a pin 101 which extends upwardly as seen in FIG. 8 through the hole 100 and also through the aperture 96 in the plate component 92 of the finger when the latter is in the working position 95. The upper end of pin 101 is thus disposed in the hollow 102 of sleeve 97 and is pivotally connected to the finger at this end by a transverse pivot pin 103 which extends through the upper end of pin 101 and through the sides of the sleeve as shown in FIG. 7. Pin 103 is press fit in the aligned holes in the sleeve component of the finger, and serves to establish a pivot axis for pivotal movement of the finger with respect to the retainer of the mounting mechanism 76 as will be seen subsequently. The bottom end of pin 101 carries a square washer 104 which is fixed between a pair of nuts 105 that are threaded on the lower end of the pin to securely hold the washer in place. Washer 104 loosely fits between the flanges 79 and 80 of channel 98 but the forward and rear edges of the washer are in sufficiently close proximity to the flanges as to prevent rotary movement of pin 101 for all practical purposes and thus also to prevent rotary movement of the finger 75 component of assembly 62. The pin component 101 of the retaining device 91 is surrounded by a coiled compression spring 106 and which is compressed between the upper wall 107 of the channel and the washer 104. Spring 106 is adapted and arranged to retain the finger in its working position in the arrangement against normal forces encountered by the finger in detaching fruit from the branches and constantly urges the plate component 92 of finger 75 against the upper surface 94 of wall 107 when the finger is in the working position 95 depicted in solid lines in FIG. 8.

As best seen in FIG. 7 plate 92 has a cutout portion which provides a slot 108 that extends from the trailing edge 109 of the plate to the aperture 96. At this point in the base structure of finger 75, the sleeve 97 is also provided with a cutout portion along the rear side as indicated at 110, and which provides a slot in the wall of the sleeve that communicates with the hollow 102. This slot 110 opens into slot 108 and permits the finger to pivot with respect to the axis of pin 103 between the knock down or inoperative position shown in FIG. 9 and designated at 111 and the working position 95, and do this without obstruction from pin 101.

The manner in which the spring type devices cooperate with the fingers in the assembly and their function is best illustrated by reference to FIGS. 8 and 9 and more particularly to the pivotal movements of finger 75 shown therein. In FIG. 8 finger 75 and the spring retainer 91 are shown in solid lines in the positions they assume when finger 75 is in the working position designated at 95. Finger 75, like the other fingers in the assembly, has one side 112 at the leading side of the assembly and at which the fruit is encountered by the finger and in cooperation with the adjacent finger detached from the branches of the tree in the normal pattern of operation of the picking mechanism. The trailing edge 109 of plate 92 on the other hand is at the opposite side 113 of the finger 75. When finger 75 encounters an obstruction, such as a nonyielding limb in the tree structure, the finger starts to pivot backwardly against the urgings of spring 106 and out of its cooperating working position in the assembly as in the direction of arrow 114. As this is hapening, the forces which operate against the working side 112 exert a leveraged lifting force on the pivot pin 103 and which counteracts the normal urgings of spring 106 on the pin 103, with the trailing edge 109 of the plate component functioning against the surfaces 94 at the fulcrum for the leverage action. As such, pin 101 is drawn upwardly as pivot 103 is drawn away from the surfaces 94 by the leverage action, and by reasons of the confining nature of the wall edges at aperture 100 and which limit forward and rearward movement of pin 101, edge 109 is drawn slidingly forwardly along the surfaces 94 toward the leading side of the surface as the pivotal movement of the finger 75 progresses from the working position toward the knocked down non-working position 111. The movement of edge 109 toward the leading side of the assembly is illustrated at one stage in the pivotal movement of finger 75 from the working position to the non-working position by the broken line position 115 for the finger in FIG. 8. The raised positions for the pivot pin 103 and pin 101 at the time the finger has pivoted to the position shown at 115 and the corresponding position for washer 104 are designated at 116 and 117 respectively in FIG. 8.

As finger 75 continues to pivot backwardly from the position shown at 115 in FIG. 8, there is a point reached in the pivotal movement at which the trailing edge 109 of plate 92 is at the center line of the resultant forces operating on the pivot element by spring 106. Up until this point is reached, spring 106 is capable of returning the finger to the working position in the assembly and hence the spring serves to not only resist pivotal movement of the finger out of the working position but also serves to return the finger to the working position when the deflection of the finger by the obstruction is insufficient to carry the edge 109 through the center line of the resultant forces. However as finger 75 pivots further towards the non-working position 111, edge 109 moves beyond the center line of resultant forces and hence the resultant forces imparted on the finger assembly by retainer mechanism 91 are such as to aid further pivotal movement of the finger into the non-working position 111 shown in FIG. 9. At this point, edge 109 has moved from the trailing side of surface 94 to the leading side of surface 94 and the urgings of spring 106 are such as to retain the finger in the non-working position until such time as the finger is again returned to the working position.

It is believed obvious at this point, that spring 106 is adapted and arranged to urge the plate 92 against the upper surface 94 of channel 78 when the finger is in the working position and to do this with sufficient force to overcome pivotal movement out of the working position by virtue of forces exerted against the working side 112 of the finger and which are normally encountered by the finger in detaching fruit from the tree. On the other hand spring 106 is insufficient in strength to overcome forces exerted against the working side which exceed those normally encountered during the process of detaching the fruit from the branch and hence yields to the superior forces and permits the finger to pivot toward the non-working position.

It is also believed evident from the description so far that each finger 77 in assembly 62 as well as in the other assemblies is so mounted as to be capable of being knocked down upon encountering an obstruction and to do so independantly of and without regard for the position of the other fingers in the assembly. As such when picking mechanism 24 is in use and the assemblies are traversing the path 65 taken by belt 50, and one of the fingers 77 in the assembly is knocked down into the inoperative position for reasons of having encountered an abnormal obstruction in the path followed by the finger, the remaining fingers are nevertheless capable of carrying out their intended function apart from the nonoperating component in the assembly during the remainder of the cycle followed by the assemblies. In addition spring retainer 91, by virtue of the arrangement, permits a limited amount of pivotal movement when the finger encounters an obstruction and is still capable of returning the finger to the working position. Thus, upon encountering an obstruction in the tree structure, finger 75 can pivot backwardly and thus yield to the pressure of the obstruction against the working side of the finger and still be brought back into the working position by the spring retainer 91 so long as the force exerted against the working side of the finger does not continue to the point at which edge 109 passes in under the pivot axis of the finger. This feature has certain advantages in that as the assemblies pass through the fruit laden area of the tree being subjected to the action of the picking mechanism 24, it not infrequently happens that the fingers of one assembly will deflect the branch in the direction of movement of the assembly and which will thereafter spring back against the fingers of the next assembly in the arrangement. As this happens fruit carried by the branch may momentarily exert a force sufficient to start the pivotal movement of a finger toward the non-working position while nevertheless being insufficient to sustain the movement and hence the finger encountering the force merely snaps back into the working position in the assembly after the momentary encounter with the fruit and thus retain its functioning position in the assembly.

The operation of the set-up devices is best understood by reference to FIGS. 4, 5, 10 and 11 wherein it is deemed evident that each assembly in the normal operation of the mechanism 24 follows a continuous path in accord with that determined by the flight paths of belt 50, the assemblies moving as for example in the direction of arrow 53 along the top flight 120 of belt 50 and in the direction of arrow 121 along the bottom flight of the belt. The severance of the fruit from the tree is accomplished as the assemblies move along the working face 39 of the picking mechanism and as the picked fruit is discharged from each assembly, it passes around the drive roll 52 and traverse the path followed by the bottom flight of the belt. As the assemblies move along the top flight, the yokes 69 associated therewith are normally supported on the upper face of the belt. Thereafter as the assemblies move around roll 52, the levers 72 ride over the bearing housings for shaft 55. Thereafter along the bottom flight of belt 50, the yokes 69 are either supported on the fingers retained in the non-working position of the assembly or hang free as seen in FIG. 5 by reference to the yoke associated with assembly 64 until such time as the levers 72 engage the cam component 73.

FIG. 10 shows in broken lines 123, the general position which the yokes assume in respect to the fingers of the assemblies which are in the non-working positions as these assemblies progress along the bottom flight 122 toward the cam component of the set-up mechanisms. In solid lines in FIG. 10, is seen the finger 75 of assembly 62 in the position it may assume in being set up by the yoke just before it reaches the working position in the pivotal movement encountered as the finger returns to the working position. The cams 73, as seen by reference to the one shown in FIG. 11 are mounted on the side channels 27 adjacent the idler rolls 51 and have a protuberance 124 which juts inwardly of the channel and into the space between the belt and the channel so as to be in operative alignment with the movement of the levers 72 of the yoke type set-up devices. At this point it may be pointed out that the cams are arranged to cooperate with the yoke components in setting up the fingers at a point along the path traversed by the assemblies which is remote from the working face of the picking mechanism so that as the fingers are set up into the working positions they are not in an area where branches, fruit or limbs of the tree will be encountered by the fingers and which could be damaged as the fingers are again aligned in the assembly. Thus as the assembly is carried forwardly along the bottom flight the set-up device is actuated as the levers 72 encounter the protuberances 124. As the levers pass over the cams, the cross piece 71 of the yoke is urged to pivot in the direction of arrow 125 so that the cross piece 71 encounters the sides 113 of the fingers in the non-working position in the assembly and which face the belt in such non-working positions and forces the fingers out of the non-working positions against the urgings of the springs and back up into their working positions in the assembly. As this happens, of course the edge 109 of plate 92 slides from the leading side of surface 94 to the trailing side of the surface, and thus passes again through the center line of resultant forces imparted on the finger assembly by the spring retainer 91 and upon passing between surface 94 and pivot pin 103, the urgings of the spring 106 serve to aid in setting up the finger in the working position.

Operation of the harvester is deemed evident from the previous disclosure but in summary, it may be said that in the normal use of the embodiment shown in the figures, motor 54 is initially energized so that the belt 50 is driven along path 65 and thus carries the respective assemblies successively along the path traversed by the belt. Thereafter the operator of the tractor 11 through suitable control of cylinders 20 and 32 may orient the face of the picking mechanism 24 in a suitable manner so that the fingers of the respective assemblies pass beneath the branches and then up through the branches along the face 39 to therealong engage the fruit between the fingers and at the working sides thereof. As this happens the fruit is detached from the tree as the assemblies progress along the path of the top flight of the belt and thereafter at the discharge end of the picking mechanism, the picked fruit falls into the gathering compartment 25. Each finger which is knocked down through an encounter with an obstruction as the finger passes along the top flight of the belt, is thereafter set up along the bottom flight of the belt as the levers of the set-up devices encounter the cams to actuate the devices in the manner previously described. Finally when the compartment is filled, the driver, by suitable manipulation of the picking mechanism, can tilt the mechanism 24 so that the contents of the compartment roll over wall section 44 and into a suitable container therebelow. Thereafter the picking process can be continued.

Among the advantages derived through use of the means for mounting the fingers described herein lies in the manner in which the fingers become disentangled from branches of the tree when entanglements develop and without undue damage to the branch structure. Normally entanglements develop when a branch becomes interlocked and entangled with two or more fingers that are aligned in working positions in one of the assemblies. When this happens the fingers entangled by the branches tend to pivot out of the working position in a backward direction and this enables the fingers to withdraw themselves from the entanglement by the normal forward progression of the fingers along the path traversed by the assemblies. In the preferred embodiment of the invention the stems of the fingers are preferably rigid structures which will not bend into the spaces between the fingers in the assembly to permit the entangled branches to knot up as the fingers are withdrawn from the entanglements. On the other hand, by using fingers that are provided with flexible stems in conjunctions with the pivotal means for pivoting the fingers advocated herein, the problems associated with whip back of deflected flexible components will be materially minimized.

It is deemed evident that although the fingers are shown assembled in comb like rows that various other arrangements may be made in the fingers and that the concepts of the invention may be embodied in apparatus considerably varying from that shown herein. One of the main advantages of the invention lies in the ability to reduce the amount of damage to the trees and fruit in the course of harvesting with more conventional comb or rake type equipment.

While only certain preferred embodiments of this invention have been shown and described by way of illustration, many modifications will ocur to those skilled in the art and it is, therefor, desired that it be understood that it is intended in the appended claims to cover all such modifications as fall within the true spirit and scope of this invention.

What is claimed as new and what it is desired to secure by Letters Patent of the United States is:

1. The combination comprising a self-propelled vehicle, a frame mounted on the vehicle, a picking mechanism carried by the frame for picking fruit from the branches of a tree and means for orienting the picking mechanism with respect to the branches which includes means for raising and lowering the frame; said picking mechanism comprising an assembly, and driven means for moving the assembly through the branches of the tree; said assembly including a plurality of fingers which are spaced apart in the assembly, and mounting means mounting the fingers on said driven means; each of said fingers being arranged in the assembly in a working position therefor and at which the finger is adapted upon encountering fruit in the branches to cooperate in detaching the fruit from the branches with an adjacent one of the fingers in the arrangement; said mounting means comprising means establishing an axis for pivotal movement of said finger between the working position in the arrangement therefor and a non-working position in the assembly therefor, and spring means retaining said finger in the working position in the arrangement therefor and being adapted to resist pivotal movement of said finger out of said working position; said spring means being yieldable to permit said finger to pivot out of its working position in the arrangement in response to a force resisting movement of the finger through the branches and which force is in excess of the forces imparted to the finger by the fruit in detaching the fruit from the branches.

2. The combination in accord with claim 1 wherein said spring means is further adapted and arranged to retain said finger at the non-working position in the assembly therefor and to resist pivotal movement of said finger out of said non-working position.

3. The combination in accord with claim 1 wherein the picking mechanism further comprises means carried by said driven means for deflecting fruit away from said mounting means during the moving of said assembly.

4. The combination in accord with claim 1 wherein said spring means is further adapted and arranged to retain said finger at the nonworking position in the assembly therefor and to resist pivotal movement of said finger out of said non-working position, and wherein said picking mechanism further comprises means carried by said driven means and actuatable to return said finger from the nonworking position therefor to the working position therefor.

5. The combination in accord with claim 1 wherein said driven means comprises a continuous belt for moving said assembly along a continuous path having a portion that extends through the branches of the tree, wherein said spring means is further adapted and arranged to retain said finger at the non-working position in the assembly and to resist pivotal movement of said finger out of said non-working position, and wherein said picking mechanism further comprises means carried by said driven means and actuatable to return said finger from the nonworking position therefor to the working position therefor, and means cooperating with and for actuating the actuatable means at a position along said continuous path which is removed from said portion.

6. A mechanism for picking fruit from the branches of a tree comprising an assembly, and driven means for moving the assembly through the branches of the tree; said assembly including a plurality of fingers which are spaced apart in the assembly, and mounting means mounting the fingers on said driven means, each of said fingers being arranged in the assembly in a working position therefor and at which the finger is adapted upon encountering fruit in the branches to cooperate in detaching the fruit from the branches with an adjacent one of the fingers in the arrangement; said mounting means comprising means establishing an axis for pivotal movement of said finger between the working position in the arrangement therefor and a nonworking position in the assembly therefor, and spring means retaining said finger in the working position in the arrangement therefor and being adapted to resist pivotal movement of said finger out of each of the working and nonworking positions therefor; said spring means being yieldable to permit said finger to pivot out of its working position in the arrangement in response to a force resisting movement of the finger through the branches and which force is in excess of the forces imparted to the finger by the fruit in detaching the fruit from the branches and to further permit said finger to be pivoted out of its nonworking position in the assembly.

7. A mechanism for picking fruit from the branches of a tree in accord with claim 6 wherein the axis extends transversely of the path traversed by the assembly in moving the assembly through the branches, wherein said fingers are rigid components of the assembly, and thereby incapable of being deflected into the space between the fingers.

8. A mechanism for picking fruit from the branches of a tree in accord with claim 6 further comprising means for pivoting said finger out of its nonworking position in the assembly against the resistance of said spring means and to return said finger to its working position in said arrangement.

9. A mechanism for picking fruit from the branches of a tree in accord with claim 6 further comprising means carried by said driven means for deflecting fruit away from said mounting means during the moving of said assembly.

10. In an apparatus for harvesting citrus fruit, a mechanism for picking the fruit from the branches of the tree comprising an assembly, a continuous belt adapted and arranged to be driven along a continuous path extending through the branches of the tree; said assembly including a plurality of elongated, rigid fingers which are spaced apart in the assembly, and mounting means secured to the belt and movable therewith mounting the fingers on and for movement with said belt; each of said fingers being arranged in the assembly in a working position therefor and at which the finger projects away from the face of the belt and is adapted upon encountering fruit along said path to cooperate in detaching the fruit from the branches with an adjacent one of the fingers in the arrangement; said mounting means comprising means establishing an axis for pivotal movement of said finger between the working position in the arrangement therefor and a nonworking position in the assembly therefor, said finger having a trailing side which faces rearwardly of the direction of movement of the assembly when the finger is in its working poistion in the arrangement and which faces the face of the belt in the nonworking position therefor, and further comprising spring means coupled to the axis establish means and retaining said finger in the working position in the arrangement therefor and being adapted to retain the finger in its nonworking position in the assembly, said spring means being further adapted and arranged to resist pivotal movement of said finger out of each of the working and nonworking positions therefor, and further being yieldable to permit said finger to pivot out of its working position in the arrangement in response to a force exerted against the side opposite said trailing side and which is in excess of the forces imparted to the finger by the fruit in detaching the fruit from the branches of the tree and to further permit said finger to be pivoted out of its nonworking position in the assembly.

11. In an apparatus for harvesting citrus fruit, a mechanism for picking the fruit from the branches of the tree in accord with claim 10 further comprising means carried by said belt for deflecting fruit away from said mounting means, and means actuatable along the path to return said finger from the non-working position therefor to the working position therefor.

12. In an apparatus for harvesting citrus fruit, a mechanism for picking the fruit from the branches of the tree comprising an assembly including a plurality of elongated rigid fingers which are spaced apart and arranged in working positions at which each of the fingers is adapted upon encountering fruit to cooperate in detaching the fruit from the branches with an adjacent one of the fingers in the arrangement, and mounting means having a surface and supporting said fingers in said working positions; each finger of said plurality having a base plate resting against said surface, further having a side at which the fruit is encountered in the arrangement, and further having a retainer component of the mounting means associated therewith and retaining the finger in the assembly and in the working position therefor in the arrangement; said retainer component comprising pivot means establishing a pivot axis above and parallel to said surface and at the base end of said finger for pivotal movement of the finger between its working position in the arrangement and a non-working position in the assembly, and spring means coupled to said pivot means and therethrough urging said plate against said surface, and thereby retaining said finger in its working position in the arrangement; said spring means being adapted and arranged to further retain said finger in its non-working position in said assembly and to resist pivotal movement of said finger out of each of the working and non-working positions therefor, and said spring means being yieldable to permit said finger to pivot out of its working position in the arrangement in response to a force exerted against said side and which force is in excess of the forces exerted against said side by the fruit in being detached from the branches thereby and to further permit said finger to be pivoted out of its non-working position in the assembly, said plate having an edge offset from said axis and opposite said side and which edge is adapted and arranged to slide under said pivot means on said surface and from one side to the other side of the axis established thereby as said finger pivots from its working position in the assembly, said edge being further adapted and arranged to serve at the fulcrum of leverage forces action against the urgings of said spring means and imparted to said pivot means as said finger pivots out of its working position in the arrangement, and said pivot means being adapted and arranged to rise with respect to said surface as said finger pivots out of its working position in the arrangement and thereafter to fall toward said surface under the urgings of said spring means as said edge passes beyond said axis toward said other side.

13. In an apparatus for harvesting citrus fruit, a mechanism for picking the fruit from the branches of the tree in accord with claim 12 further comprising driven belt means for moving the assembly through the branches of the tree and along a continuous path, and means automatically actuatable along said path and arranged to encounter said finger at its non-working position for returning the finger to its working position in the arrangement.

References Cited
UNITED STATES PATENTS

| | | | |
|---|---|---|---|
| 1,147,961 | 7/1915 | Matlock | 56—49 |
| 2,158,299 | 5/1939 | Oppenheim | 56—400 |
| 2,406,772 | 9/1946 | Hunter | 287—99 XR |
| 2,508,454 | 5/1950 | Goodwin | 56—328 |
| 2,780,904 | 2/1957 | Bowie et al. | 56—328 |
| 2,870,594 | 1/1959 | Larsh | 56—328 |
| 3,099,347 | 7/1963 | Dahlquist | 56—400 XR |

RUSSELL R. KINSEY, *Primary Examiner.*